US008781406B2

(12) United States Patent
Fukuma (10) Patent No.: US 8,781,406 B2
(45) Date of Patent: Jul. 15, 2014

(54) RECEIVING APPARATUS (75) Inventor: Hiroyuki Fukuma, Osaka (JP)

(73) Assignee: Onkyo Corporation, Neyagawa-shi (JP)

( * ) Notice: Subject to any disclaimer, the term of this patent is extended or adjusted under 35 U.S.C. 154(b) by 257 days.

(21) Appl. No.: 13/473,757

(22) Filed: May 17, 2012

(65) Prior Publication Data
US 2013/0095766 A1 Apr. 18, 2013

(30) Foreign Application Priority Data

Oct. 14, 2011 (JP) .................... 2011-227118

(51) Int. Cl.
H04B 1/00 (2006.01)
H04B 7/00 (2006.01)

(52) U.S. Cl.
USPC ........ 455/68; 455/3.06; 455/41.2; 455/435.1; 455/566; 455/556.2; 455/550.1; 709/203; 709/220; 379/280

(58) Field of Classification Search
USPC ..................... 455/68, 3.06, 556.2, 566, 435.1
See application file for complete search history.

(56) References Cited

U.S. PATENT DOCUMENTS

| 5,832,194 | A  | * | 11/1998 | Braun et al. ................ 714/1 |
| 6,246,441 | B1 | * | 6/2001  | Terakado et al. ............ 348/552 |
| 8,229,359 | B2 |   | 7/2012  | Hino et al. |
| 8,261,090 | B1 | * | 9/2012  | Matsuoka .................... 713/186 |
| 8,380,126 | B1 | * | 2/2013  | Ma et al. ..................... 455/41.2 |
| 8,615,551 | B2 | * | 12/2013 | Balandin et al. ............. 709/204 |
| 8,635,317 | B2 | * | 1/2014  | Ylinen et al. ................ 709/223 |

FOREIGN PATENT DOCUMENTS

| EP | 1 187 350 A2 | 3/2002 |
| JP | 10-181605 | 7/1998 |
| JP | 2002-135350 | 5/2002 |
| JP | 2002-312155 | 10/2002 |
| JP | 2005-333395 | 12/2005 |
| JP | 2006-350473 | 12/2006 |
| JP | 2010-040124 | 2/2010 |
| JP | 2010-050580 | 3/2010 |
| JP | 2011-010100 | 1/2011 |
| JP | 2011-101124 | 5/2011 |
| WO | 2007/047128 A1 | 4/2007 |

OTHER PUBLICATIONS

European Search Report for corresponding European Application No. 12168000.3 issued Jan. 21, 2013.

* cited by examiner

Primary Examiner — Marceau Milord
(74) Attorney, Agent, or Firm — Renner, Otto, Boisselle & Sklar, LLP (57) ABSTRACT A receiving apparatus obtains identification information from a transmitting apparatus via a cable communication when the transmitting apparatus is connected with the receiving apparatus via the cable communication while the receiving apparatus is being connected with the transmitting apparatus via a radio communication. The receiving apparatus judges whether obtained identification information is the same as identification information of the transmitting apparatus which is connected with the receiving apparatus via the radio communication. When they are same, the receiving apparatus transmits an instruction to the transmitting apparatus to switch an output of contents data from the radio communication to the cable communication. When the transmitting apparatus receives the instruction, it switches the output of the contents data from the radio communication to the cable communication. The receiving apparatus switches an input of the contents data to the receiving apparatus from the radio communication to the cable communication.

12 Claims, 5 Drawing Sheets

| 8 | |
| --- | --- |
| 7 | |
| 6 | |
| 5 | |
| 4 | TRANSMITTING APPARATUS D |
| 3 | TRANSMITTING APPARATUS C |
| 2 | TRANSMITTING APPARATUS B |
| 1 | TRANSMITTING APPARATUS A |

RECEIVING APPARATUS

BACKGROUND OF THE INVENTION

1. Field of the Invention

The present invention relates to a receiving apparatus capable of providing a cable connection and a radio connection for a transmitting apparatus.

2. Description of the Related Art

Contents transmitting/receiving systems with a transmitting apparatus including a storage medium which can record a music file such as a flash memory and a receiving apparatus with an amplifier and a speaker have been used. The transmitting apparatus reproduces a music file and transmits music data to the receiving apparatus by using a radio communication such as Bluetooth or the like. Alternatively, the transmitting apparatus reproduces a music file and transmits music data to the receiving apparatus by using a cable communication such as a USB or the like. The receiving apparatus receives the music data, amplifies it, and outputs the audio from the speaker.

In order to establish a cable connection of the receiving apparatus with the transmitting apparatus, which is in radio communication with the receiving apparatus, and transmit music data by the cable communication, user operations are required to switch an output selector of the transmitting apparatus from the radio communication to the cable communication and switch an input selector of the receiving apparatus from the radio communication to the cable communication. Conversely, in order to establish a radio connection of the receiving apparatus with the transmitting apparatus, which is in cable communication with the receiving apparatus, and transmit music data by the radio communication, user operations are required to switch the output selector of the transmitting apparatus from the cable communication to the radio communication and switch the input selector of the receiving apparatus from the cable communication to the radio communication.

SUMMARY OF THE INVENTION

An object of the present invention is to provide a receiving apparatus which is capable of switching a connection with a transmitting apparatus between a cable connection and a radio connection without requiring a user operation.

A receiving apparatus of the preferred embodiment of the present invention which is capable of connecting with a transmitting apparatus and receives contents data, wherein the transmitting apparatus transmits the contents data. The receiving apparatus comprises: a radio communication unit which connects with the transmitting apparatus via a radio communication; a cable communication unit which connects with the transmitting apparatus via a cable communication; an identification information obtaining section which obtains identification information of the transmitting apparatus, which is used in the radio communication, from the transmitting apparatus via the cable communication when the transmitting apparatus is connected via the cable communication while the receiving apparatus is being connected with the transmitting apparatus via the radio communication; an identification information judging section which judges whether the identification information of the transmitting apparatus, which is being connected with the receiving apparatus via the radio communication, is the same as the identification information obtained by the identification information obtaining section; and a switch controlling section which transmits an instruction to the transmitting apparatus to switch an output of the contents data from the radio communication to the cable communication and switches an input of the contents data to the receiving apparatus from the radio communication to the cable communication when the identification information judging section judges that the identification information of the transmitting apparatus is the same as the obtained identification information.

The receiving apparatus obtains identification information from the transmitting apparatus via a cable communication, when the transmitting apparatus is connected via the cable communication while the receiving apparatus is being connected with the transmitting apparatus via the radio communication. The receiving apparatus judges whether the identification information obtained via the cable communication is the same as identification information of the transmitting apparatus which is currently connected with the receiving apparatus via the radio communication. When they are the same, it is judged that the transmitting apparatus which is connected via the cable communication is the same as the transmitting apparatus which is currently connected via the radio communication. In that case, the receiving apparatus transmits an instruction to the transmitting apparatus to switch an output of contents data from the radio communication to the cable communication. When the transmitting apparatus receives the instruction, it switches the output of the contents data from the radio communication to the cable communication. On the other hand, the receiving apparatus switches an input of the contents data to the receiving apparatus from the radio communication to the cable communication. In that manner, the contents route can be automatically switched from the radio communication to the cable communication at both sides of the transmitting apparatus and the receiving apparatus only by connecting the transmitting apparatus with the receiving apparatus via the cable communication without requiring a user operation.

Preferably the switch controlling section transmits an instruction to the transmitting apparatus to switch the output of the contents data from the cable communication to the radio communication and switches the input of the contents data to the receiving apparatus from the cable communication to the radio communication when the connection with the transmitting apparatus via the cable communication is terminated while the connection with the transmitting apparatus via the radio communication is kept.

The receiving apparatus can keep connected with the transmitting apparatus via the radio communication even when it is being connected with the same transmitting apparatus via the cable communication. In that case, if the connection with the transmitting apparatus via the cable communication is terminated, the receiving apparatus transmits an instruction to the transmitting apparatus to switch the output of the contents data from the cable communication to the radio communication. When the transmitting apparatus receives the instruction, it switches the output of the contents data from the cable communication to the radio communication. On the other hand, the receiving apparatus switches the input of the contents data to the receiving apparatus from the cable communication to the radio communication. In that manner, the contents route can be automatically switched from the cable communication to the radio communication at both sides of the transmitting apparatus and the receiving apparatus only by terminating the cable connection between the transmitting apparatus and the receiving apparatus without requiring a user operation.

Preferably the receiving apparatus further comprises an identification information managing section which manages the identification information of one or more transmitting apparatuses which are connected via the radio communication; an identification information determining section which determines the identification information same as the identification information of the transmitting apparatus, with which the connection via the cable communication is terminated, among the identification information managed by the identification information managing section when the connection with the transmitting apparatus via the cable communication is terminated while the connection with the transmitting apparatus via the radio communication is not kept; and a connection controlling section which causes the receiving apparatus to automatically connect with the transmitting apparatus via the radio communication wherein the identification information of the transmitting apparatus is identified by the identification information determining section.

When the connection with the transmitting apparatus via the cable communication is terminated while the receiving apparatus does not keep connected with the transmitting apparatus via the radio communication, the receiving apparatus can automatically determine the transmitting apparatus with which the connection via the cable communication is terminated and automatically connect with the determined transmitting apparatus via the radio communication.

Preferably the receiving apparatus further comprises a reproducing state storing section which stores a reproducing state of the transmitting apparatus, with which the connection via the cable communication is terminated, when the connection with the transmitting apparatus via the cable communication is terminated while the connection with the transmitting apparatus via the radio communication is not kept; and a reproducing state transmitting section which transmits a reproducing state stored by the reproducing state storing section to the determined transmitting apparatus to cause the transmitting apparatus to recover the reproducing state, after the receiving apparatus is automatically connected with the determined transmitting apparatus via the radio communication by the connection controlling section.

When the connection with the transmitting apparatus via the cable communication is terminated while the receiving apparatus does not keep connected with the transmitting apparatus via the radio communication, the receiving apparatus stores a reproducing state of the transmitting apparatus with which the connection via the cable communication is terminated and transmits the stored reproducing state to the transmitting apparatus when the receiving apparatus automatically connects with the transmitting apparatus via the radio communication. For example, if the transmitting apparatus is reproducing the contents when the connection via the cable communication is terminated, the receiving apparatus can make the transmitting apparatus restart reproducing the contents when the receiving apparatus automatically connects with the transmitting apparatus via the radio communication.

DETAILED DESCRIPTION OF THE PREFERRED EMBODIMENTS

Preferred embodiments of the present invention will be specifically described below with reference to the drawings, though the present invention is not limited to these embodiments.

Figure 1:
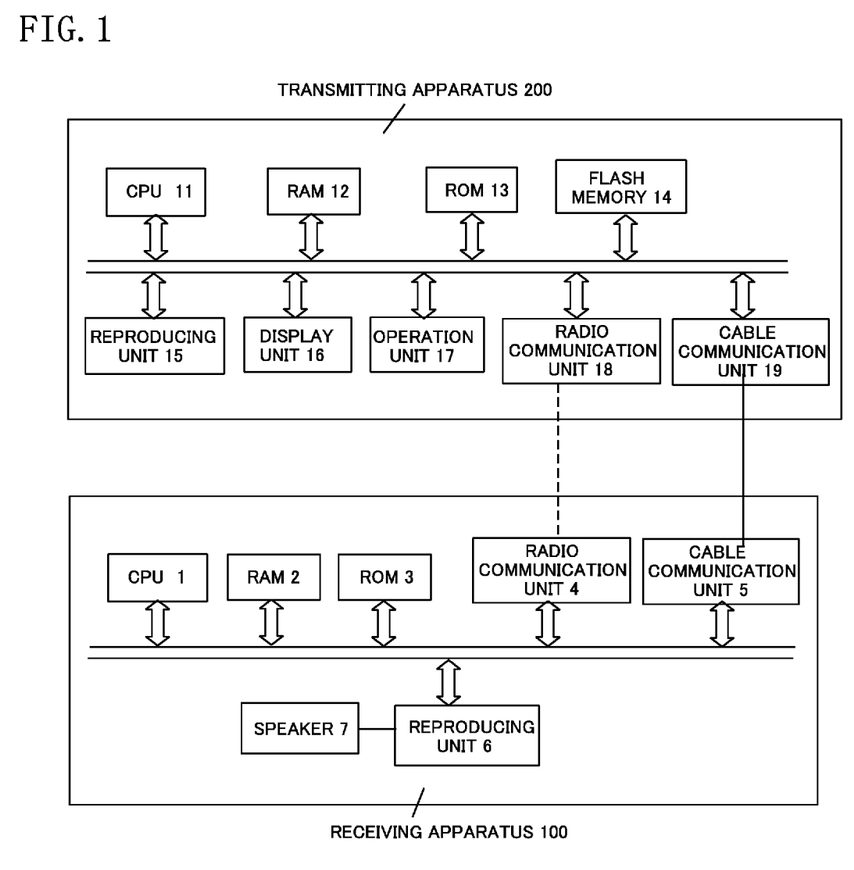
FIG. 1 is a block diagram showing a receiving apparatus 100 and a transmitting apparatus 200 according to a preferred embodiment of the present invention.

FIG. 1 is a schematic block diagram showing a contents reproducing system according to a preferred embodiment of the present invention. The contents reproducing system includes a contents receiving apparatus (hereinafter, referred to as receiving apparatus) 100 and a contents transmitting apparatus (hereinafter referred to as transmitting apparatus) 200. The receiving apparatus 100 is stationary audio equipment which is set up in each room, for example. The transmitting apparatus 200 is a music player, a smart phone, a cellular phone, a handheld game player, or the like, which is held and carried by each individual. Contents collectively refers to a music file (music data), an audio file (audio data), a video file (video data), a still image file (still image data) and the like, though it refers to a music file (music data) in this embodiment.

The receiving apparatus 100 and the transmitting apparatus 200 may interconnect with each other by using a radio communication of any standard such as Bluetooth and the like. The receiving apparatus 100 and the transmitting apparatus 200 may interconnect with each other by using a cable communication of any standard such as a USB and the like. The transmitting apparatus 200 reproduces a music file recorded in itself and transmits the reproduced music data to the receiving apparatus 100 by using the radio communication or the cable communication. The receiving apparatus 100 receives the music data transmitted from the transmitting apparatus 200, amplifies it, and outputs the audio from the speaker.

The receiving apparatus 100 roughly includes a CPU 1, a rewritable memory 2 such as a RAM or a flash memory, a ROM 3, a radio communication unit 4, a cable communication unit 5, a reproducing unit 6, and a speaker 7. The CPU 1 controls each component of the receiving apparatus 100 based on an operating program of the receiving apparatus 100 stored in the ROM 3.

The radio communication unit 4 establishes a radio connection and communicates with a radio communication unit 18 of the transmitting apparatus 200 to transmit and receive respective control commands, music data and the like to and from the transmitting apparatus 200. The radio communication unit 4 is a radio transceiver complying with, for example, Bluetooth or the like.

The cable communication unit 5 establishes a cable connection and communicates with a cable communication unit 19 of the transmitting apparatus 200, and transmits and receives respective control commands, music data and the like to and from the transmitting apparatus 200. The cable communication unit 5 is, for example, a USB interface (USB connector), a USB host controller and the like.

The reproducing unit 6 reproduces (for example, by decoding, performing a D/A conversion, performing volume control, amplifying and the like) the music data received by the radio communication unit 4 or the cable communication unit 5 from the transmitting apparatus 200 and outputs the audio from the speaker 7.

Figure 2:
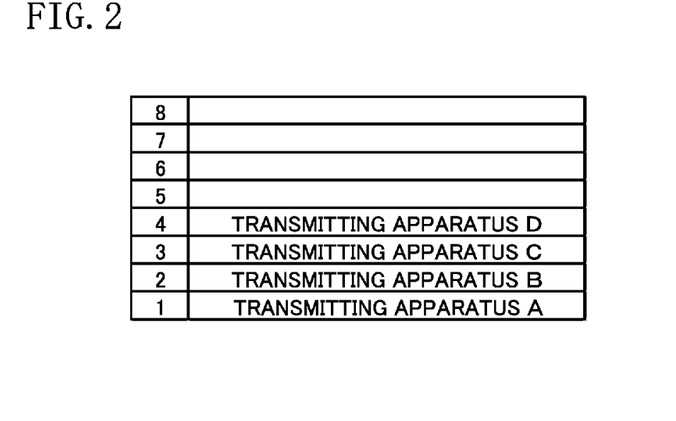
FIG. 2 is a diagram showing a connection history table.

The CPU 1 manages the identification information of one or more transmitting apparatuses 200. Specifically, the rewritable memory 2 stores a connection history table shown in FIG. 2. The connection history table is for managing a history of connection made by radio communication between the receiving apparatus 100 and the transmitting apparatus 200. The connection history table has a predetermined number (eight in this embodiment) of entries, in each of which the identification information of the transmitting apparatus 200 can be registered. The identification information is exchanged and registered by the receiving apparatus 100 and the transmitting apparatus 200 each other when they are paired, and a combination of an address and a cryptography key of the transmitting apparatus 200, for example. Alternatively, the identification information may be simply an identification number. In FIG. 2, the identification information of the transmitting apparatus is simply abbreviated like "transmitting apparatus A".

When the transmitting apparatus 200 is connected with the receiving apparatus 100 via the cable communication while the receiving apparatus 100 is being connected with the transmitting apparatus 200 via the radio communication, the CPU 1 obtains the identification information of the transmitting apparatus 200 used in the radio communication from the transmitting apparatus 200 via the cable communication. The CPU 1 judges whether the identification information of the transmitting apparatus 200 which is connected via the radio communication is the same as the identification information obtained via the cable communication, and when it judges that they are the same, it transmits an instruction to the transmitting apparatus 200 to switch an output of the music data from the radio communication to the cable communication, and switches an input of the music data to the receiving apparatus 100 from the radio communication to the cable communication.

When the connection with the transmitting apparatus 200 via the cable communication is terminated while the receiving apparatus 100 keeps connected with the transmitting apparatus 200 via the radio communication, the CPU 1 transmits an instruction to the transmitting apparatus 200 to switch the output of the music data from the cable communication to the radio communication, and switches the input of the music data to the receiving apparatus 100 from the cable communication to the radio communication.

When the connection with the transmitting apparatus 200 via the cable communication is terminated while the receiving apparatus 100 does not keep connected with the transmitting apparatus 200 via the radio communication, the CPU 1 determines the identification information which is the same as the identification information of the transmitting apparatus 200, with which the connection via the cable communication is terminated, among the identification information in the connection history table, and makes the receiving apparatus 100 automatically connect with the transmitting apparatus 200 of the determined identification information via the radio communication.

When the connection with the transmitting apparatus 200 via the cable communication is terminated while the receiving apparatus 100 does not keep connected with the transmitting apparatus 200 via the radio communication, the CPU 1 stores a reproducing state of the transmitting apparatus 200, with which the connection via the cable communication is terminated, and after the receiving apparatus 100 automatically connects with the determined transmitting apparatus 200 via the radio communication, the CPU 1 transmits the stored reproducing state to the transmitting apparatus 200 to make the transmitting apparatus 200 recover the reproducing state.

The transmitting apparatus 200 roughly includes a CPU 11, a RAM 12, a ROM 13, a contents storing unit 14 such as a flash memory, a reproducing unit 15, a display unit 16, an operation unit 17, a radio communication unit 18, and a cable communication unit 19. The CPU 11 controls each component of the transmitting apparatus 200 based on an operating program of the transmitting apparatus 200 stored in the ROM 13. In the ROM 13, a reproducing application program is installed or recorded. The CPU 11 reads out the reproducing application program onto the RAM 12 and executes it.

In the flash memory 14, a plurality of music files are recorded. The reproducing unit 15 reproduces the music file recorded in the flash memory 14 according to the reproducing application program and transmits the music data to the receiving apparatus 100 via the radio communication unit 18 or the cable communication unit 19. The display unit 16 displays contents information (such as the title of a musical composition and the name of the artist) of the music file being reproduced. The operation unit 17, which is for receiving an input of instruction based on a user operation, includes an operation button, a touch panel and the like provided on a case of the transmitting apparatus 200. The radio communication unit 18 communicates with the radio communication unit 4 of the receiving apparatus 100 to transmit and receive respective control commands, music data and the like to and from the receiving apparatus 100. The radio communication unit 18 is a radio transceiver complying with, for example, Bluetooth or the like. The cable communication unit 19 communicates with the radio communication unit 5 of the receiving apparatus 100 to transmit and receive respective control commands, music data and the like to and from the receiving apparatus 100. The cable communication unit 19 is, for example, a USB interface (USB connector) and a USB host controller.

Figure 3:
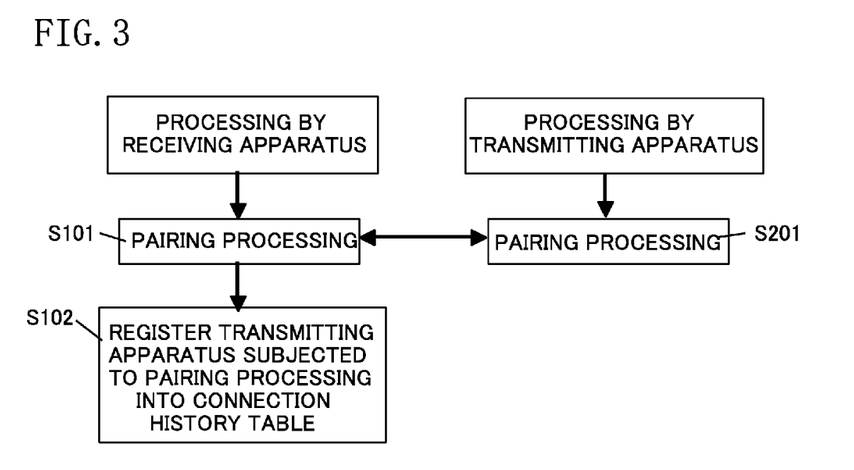
FIG. 3 is a flow chart showing pairing processing between the receiving apparatus 100 and the transmitting apparatus 200.

Operations of the embodiments will be described below. FIG. 3 is a flow chart showing pairing processing of Bluetooth between the receiving apparatus 100 and the transmitting apparatus 200. The receiving apparatus 100 and the transmitting apparatus 200 wirelessly connect with each other by using a well-known method and perform pairing processing by exchanging and registering paring information (identification information) each other (S101, S201). The CPU 1 of the receiving apparatus 100 registers the paring information (identification information) of the transmitting apparatus 200, with which the receiving apparatus 100 has newly performed the paring processing, in the connection history table.

Figure 4:
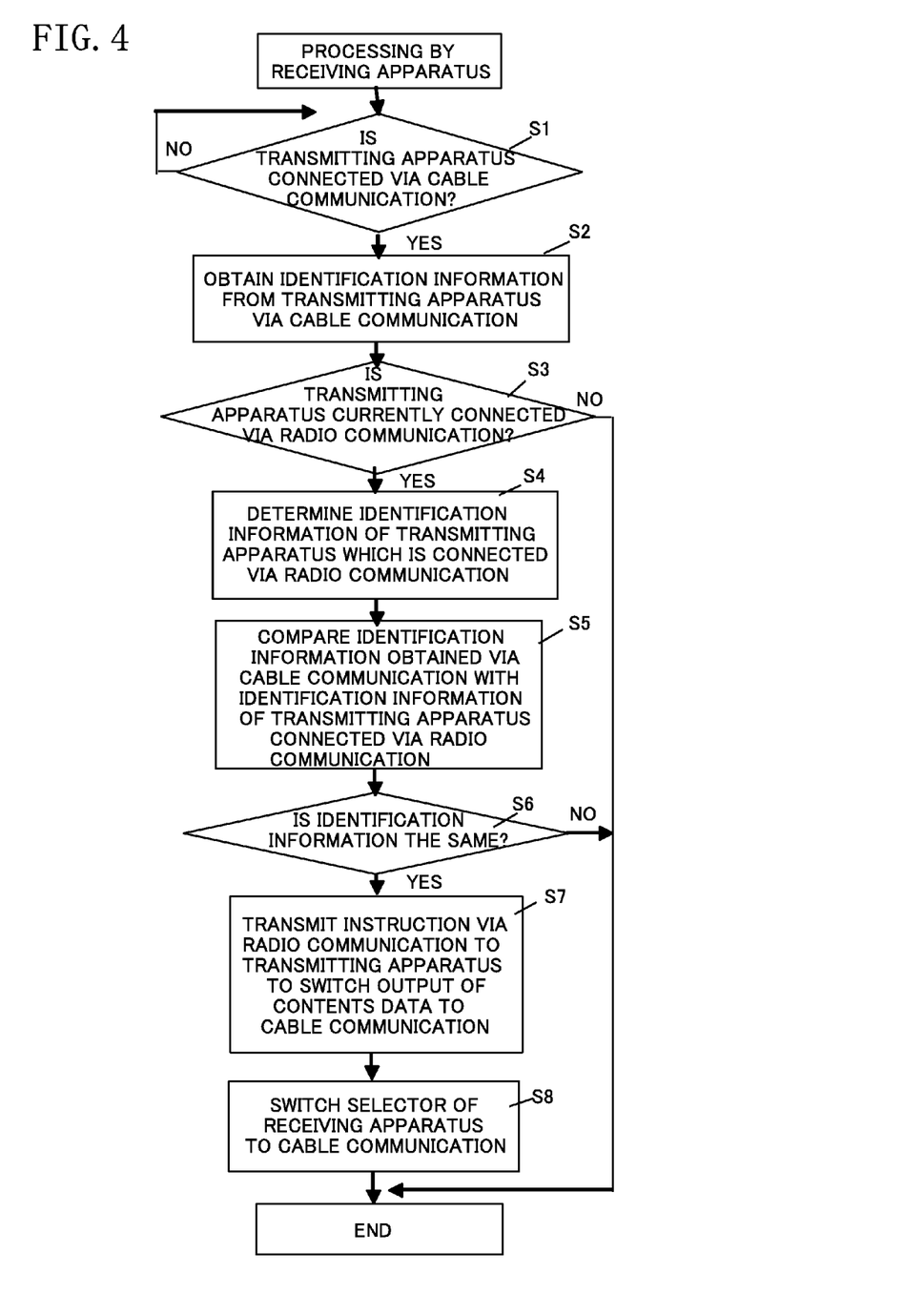
FIG. 4 is a flow chart showing processing of a CPU 1 of the receiving apparatus 100.

FIG. 4 is a flow chart showing processing by the CPU 1 of the receiving apparatus 100 performed when the cable connection is established between the transmitting apparatus 200 and the receiving apparatus 100. The CPU 1 judges whether the transmitting apparatus 200 is connected with the receiving apparatus 100 via the cable communication (S1). If they are connected (YES in S1), the CPU 1 requests the CPU 11 of the transmitting apparatus 200 to offer the identification information of the transmitting apparatus 200 and obtains the information via the cable communication (S2). Here, the identification information obtained from the transmitting apparatus 200 is not the identification information used in the cable communication (USB) but the identification information used in the radio communication.

The CPU 1 judges whether the receiving terminal 100 is currently connected with the transmitting apparatus 200 via the radio communication (S3). If they are not currently connected (NO in S3), the CPU 1 ends the processing. If they are currently connected (YES in S3), the CPU 1 determines the identification information of the transmitting apparatus 200, with which the receiving terminal 100 is currently connected via the radio communication (S4). Specifically, since the identification information of the transmitting apparatus 200 which is currently connected via the radio communication is stored in the RAM 2, the CPU 1 reads out the identification information of the transmitting apparatus 200 from the RAM 2 and determines it.

The CPU 1 compares the identification information obtained from the transmitting apparatus 200 via the cable communication and the identification information of the transmitting apparatus 200 which is currently connected with the receiving apparatus 100 via the radio communication (S5), and judges whether they are the same (S6). That is, it is judged whether the transmitting apparatus 200 which is connected via the cable communication and the transmitting apparatus 200 which is currently connected via the radio communication are the same transmitting apparatus 200. If they are not the same (NO in S6), it is judged that the transmitting apparatus 200 which is connected via the cable communication and the transmitting apparatus 200 which is currently connected via the radio communication are different, and the CPU 1 ends the processing.

If they are the same (YES in S6), it is judged that the transmitting apparatus 200 which is connected via the cable communication and the transmitting apparatus 200 which is currently connected via the radio communication are the same, then, the CPU 1 transmits an instruction to the transmitting apparatus 200 which is connected via the radio communication to switch an output selector for the music data from the radio communication to the cable communication (S7). When the transmitting apparatus 200 receives the instruction via the radio communication, it switches the output selector for the music data from the radio communication to the cable communication.

The CPU 1 switches an input selector for the audio data of the receiving apparatus 100 from the radio communication to the cable communication (S8). In that manner, the selectors of both the receiving apparatus 100 and the transmitting apparatus 200 can be automatically switched from the radio communication to the cable communication by simply connecting the transmitting apparatus 200 with the receiving apparatus 100 via the cable communication without requiring a user operation of switching the selectors of both the receiving apparatus 100 and the transmitting apparatus 200 from the radio communication to the cable communication.

As described above, if it is judged that the transmitting apparatus 200 which is connected via the cable communication and the transmitting apparatus 200 which is currently connected via the radio communication are different, the selectors of both the receiving apparatus 100 and the transmitting apparatus 200 are not switched from the radio communication to the cable communication. Therefore, it can prevent a different music data from replacing the music data which the receiving apparatus 100 is receiving and reproducing from the transmitting apparatus 200 different from the transmitting apparatus 200 which is connected with the receiving apparatus 100 via the cable communication.

Here, it is preferable to keep the radio communication between the transmitting apparatus 200 and the receiving apparatus 100 even if the selectors of both the receiving apparatus 100 and the transmitting apparatus 200 are switched from the radio communication to the cable communication. This is because that enables immediate resumption of the music data transmission by using the radio communication when the cable communication between the transmitting apparatus 200 and the receiving apparatus 100 is terminated afterwards.

Figure 5:
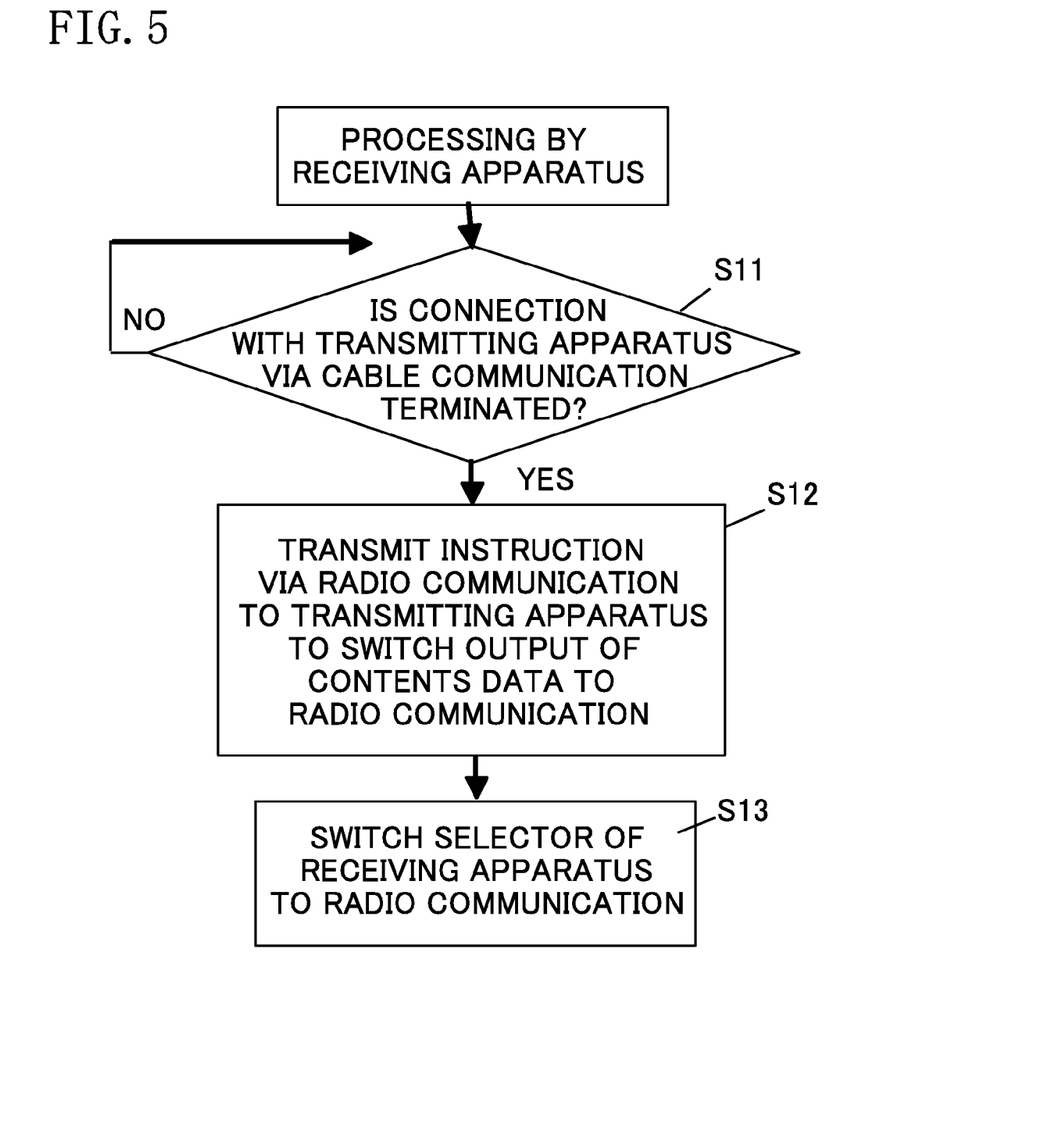
FIG. 5 is a flow chart showing processing of the CPU 1 of the receiving apparatus 100.

FIG. 5 is a flow chart showing processing by the CPU 1 of the receiving apparatus 100 performed when the cable connection with the transmitting apparatus 200 is terminated. In this processing, as described above, it is assumed that the radio communication between the transmitting apparatus 200 and the receiving apparatus 100 is kept even if the selectors of both the receiving apparatus 100 and the transmitting apparatus 200 are switched from the radio communication to the cable communication.

The CPU 1 judges whether the connection with the transmitting apparatus 200 via the cable communication is terminated (S11). If the connection via the cable communication is terminated (YES in S11), the CPU 1 transmits an instruction to the transmitting apparatus 200 via the radio communication to switch the output selector for the music data from the cable communication to the radio communication (S12). When the transmitting apparatus 200 receives the instruction via the radio communication, it switches the output selector for the music data from the cable communication to the radio communication.

The CPU 1 switches the input selector for the audio data of the receiving apparatus 100 from the cable communication to the radio communication (S13). In that manner, the selectors of both the receiving apparatus 100 and the transmitting apparatus 200 can be automatically switched from the cable communication to the radio communication by simply terminating the connection of the transmitting apparatus 200 with the receiving apparatus 100 via the cable communication without requiring a user operation of switching the selectors of both the receiving apparatus 100 and the transmitting apparatus 200 from the cable communication to the radio communication.

Figure 6:
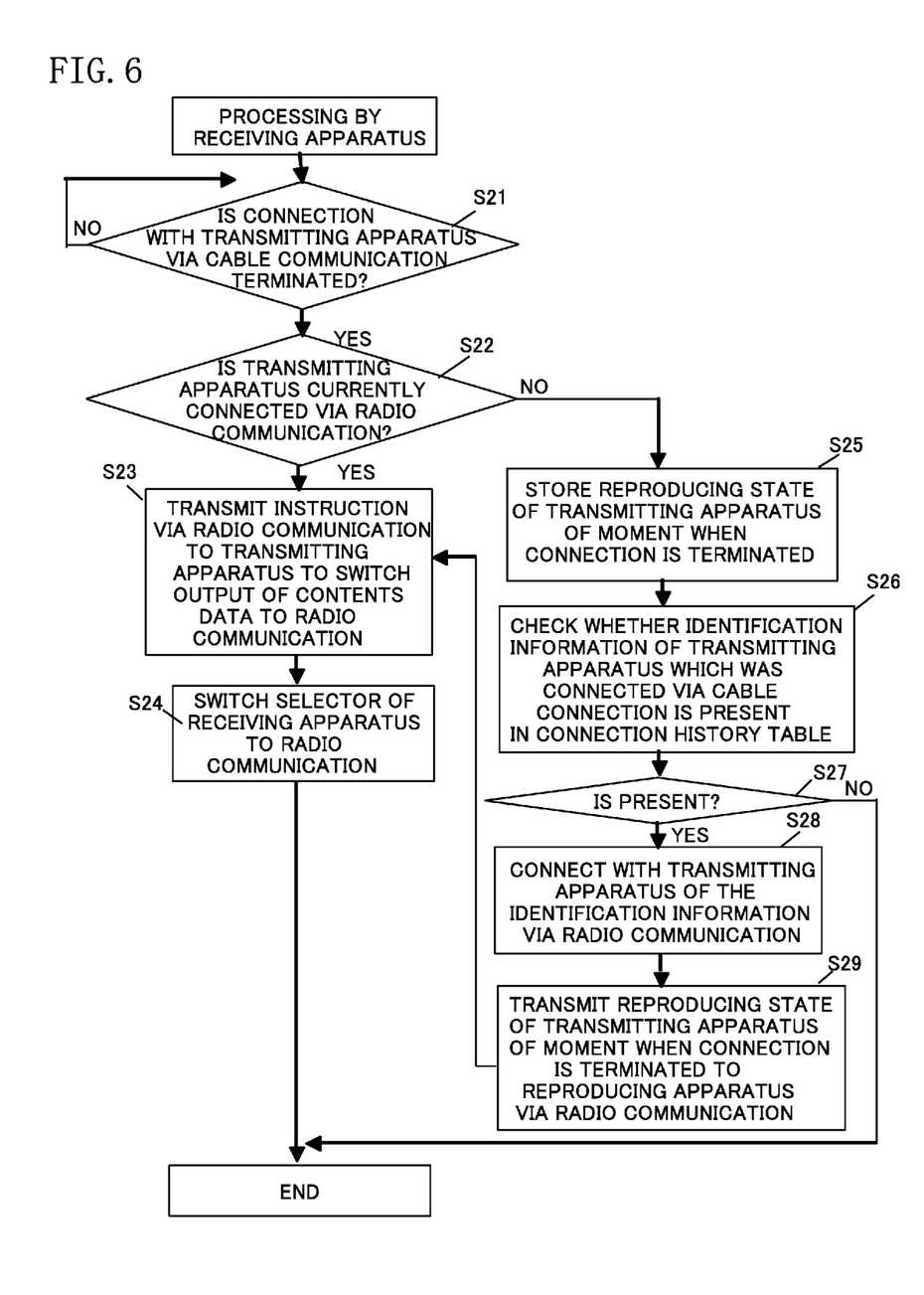
FIG. 6 is a flow chart showing processing of the CPU 1 of the receiving apparatus 100.

FIG. 6 is a flow chart showing another processing by the CPU 1 of the receiving apparatus 100 performed when the cable connection with the transmitting apparatus 200 is terminated. The CPU 1 judges whether the connection with the transmitting apparatus 200 via the cable communication is terminated (S21). If the connection via the cable communication is terminated (YES in S21), the CPU 1 judges whether the receiving apparatus 100 is currently connected with the transmitting apparatus 200 via the radio communication (S22).

If they are connected via the radio communication (YES in S22), the CPU 1 transmits an instruction to the transmitting apparatus 200 via the radio communication to switch the output selector for the music data from the cable communication to the radio communication (S23). When the transmitting apparatus 200 receives the instruction via the radio communication, it switches the output selector for the music data from the cable communication to the radio communication.

The CPU 1 switches the input selector for the music data of the receiving apparatus 100 from the cable communication to the radio communication (S24). In that manner, the selectors of both the receiving apparatus 100 and the transmitting apparatus 200 can be automatically switched from the cable communication to the radio communication by simply terminating the connection of the transmitting apparatus 200 with the receiving apparatus 100 via the cable communication without requiring a user operation of switching the selectors of both the receiving apparatus 100 and the transmitting apparatus 200 from the cable communication to the radio communication.

If it is judged that they are not connected via the radio communication in S22 (NO in S22), the CPU 1 stores in the RAM 2 the reproducing state of the transmitting apparatus 200 of the moment when the connection via the cable communication is terminated (S25). "Reproducing state" refers to the state regarding the music file reproduction such as "being reproduced", "being stopped" or the like. Alternatively, the reproducing state may include information on contents being reproduced (metadata such as the title of a musical composition and the name of the artist, reproduced position information).

Subsequently, the CPU 1 reads out from the RAM 2 the identification information of the transmitting apparatus 200, with which the connection is terminated via the cable communication (the identification information is that stored in the RAM 2 in S2 shown in FIG. 4) and checks whether the same identification information is in the connection history table shown in FIG. 2 (S26, S27). That is, it is judged whether the transmitting apparatus 200, with which the connection via the cable communication is terminated, was connected with the receiving apparatus 100 via the radio communication in the past. If it is not in the connection history table (NO in S27), the CPU 1 ends the processing.

If it is in the connection history table (YES in S27), the CPU 1 selects the identification information of the transmitting apparatus 200, with which the connection is terminated via the cable communication, from the connection history table and automatically connects the receiving apparatus 100 via the radio communication with the transmitting apparatus 200 which is determined by the identification information (S28). Specifically, the CPU 1 automatically searches for the determined transmitting apparatus 200. That is, the CPU 1 reads out the identification information of the determined transmitting apparatus 200 from the connection history table and performs polling processing. The CPU 1 judges whether a response to the polling is received from the determined transmitting apparatus 200. When the response is received from the determined transmitting apparatus 200, the CPU 1 automatically establishes the radio connection with the determined transmitting apparatus 200.

Subsequently, the CPU 1 reads out from the RAM 2 the reproducing state of the transmitting apparatus 200 which was stored at the moment when the connection via the cable communication is terminated, and transmits it to the transmitting apparatus 200 via the radio communication (S29). When the transmitting apparatus 200 receives the reproducing state, it changes the reproducing state. For example, when [reproducing] is transmitted as the reproducing state, the transmitting apparatus 200 automatically starts reproducing the music file. Then, the processing proceeds to S23, and the selectors of both the transmitting apparatus 200 and the receiving apparatus 100 are switched from the cable communication to the radio communication.

As described above, according to the processing shown in FIG. 6, the transmitting apparatus 200, with which the connection via the cable communication is terminated, is determined and the connection via the radio communication can be established, even if the transmitting apparatus 200 is not being connected with the receiving apparatus 100 via the radio communication when the connection via the cable communication is terminated.

The preferred embodiments of the present invention have been described, though the present invention is not limited to these embodiments. The radio communication standard is not limited to Bluetooth, and may be a wireless LAN, Wifi and the like. The cable communication standard is not limited to USB, and may be HDMI, IEEE1394 and the like. The present invention may be provided in the forms of a computer program or a recording medium recording the computer program for operating the receiving apparatus 100 or the transmitting apparatus 200 of the present invention.

What is claimed is:

1. A receiving apparatus which is capable of connecting with a transmitting apparatus and receives contents data, wherein the transmitting apparatus transmits the contents data, the receiving apparatus comprising:
    a radio communication unit which connects with the transmitting apparatus via a radio communication;
    a cable communication unit which connects with the transmitting apparatus via a cable communication;
    an identification information obtaining section which obtains identification information of the transmitting apparatus, which is used in the radio communication, from the transmitting apparatus via the cable communication when the transmitting apparatus is connected via the cable communication while the receiving apparatus is being connected with the transmitting apparatus via the radio communication;
    an identification information judging section which judges whether the identification information of the transmitting apparatus, which is being connected with the receiving apparatus via the radio communication, is the same as the identification information obtained by the identification information obtaining section; and
    a switch controlling section which transmits an instruction to the transmitting apparatus to switch an output of the contents data from the radio communication to the cable communication and switches an input of the contents data to the receiving apparatus from the radio communication to the cable communication when the identification information judging section judges that the identification information of the transmitting apparatus is the same as the obtained identification information.

2. The receiving apparatus according to claim 1, wherein the switch controlling section transmits an instruction to the transmitting apparatus to switch the output of the contents data from the cable communication to the radio communication and switches the input of the contents data to the receiving apparatus from the cable communication to the radio communication when the connection with the transmitting apparatus via the cable communication is terminated while the connection with the transmitting apparatus via the radio communication is kept.

3. The receiving apparatus according to claim 1, further comprising an identification information managing section which manages the identification information of one or more transmitting apparatuses which are connected via the radio communication;
    an identification information determining section which determines the identification information same as the identification information of the transmitting apparatus, with which the connection via the cable communication is terminated, among the identification information managed by the identification information managing section when the connection with the transmitting apparatus via the cable communication is terminated while the connection with the transmitting apparatus via the radio communication is not kept; and
    a connection controlling section which causes the receiving apparatus to automatically connect with the transmitting apparatus via the radio communication wherein the identification information of the transmitting apparatus is identified by the identification information determining section.

4. The receiving apparatus according to claim 3, further comprising a reproducing state storing section which stores a reproducing state of the transmitting apparatus, with which the connection via the cable communication is terminated, when the connection with the transmitting apparatus via the cable communication is terminated while the connection with the transmitting apparatus via the radio communication is not kept; and a reproducing state transmitting section which transmits a reproducing state stored by the reproducing state storing section to the determined transmitting apparatus to cause the transmitting apparatus to recover the reproducing state, after the receiving apparatus is automatically connected with the determined transmitting apparatus via the radio communication by the connection controlling section.

5. An operating method of a receiving apparatus which comprises a radio communication unit which connects via a radio communication with a transmitting apparatus which transmits contents data; and a cable communication unit which is connected with the transmitting apparatus via a cable communication wherein the receiving apparatus receives the contents data, the method comprising:

an identification information obtaining step for obtaining identification information of the transmitting apparatus, which is used via the radio communication, from the transmitting apparatus via the cable communication when the transmitting apparatus is connected via the cable communication while the receiving apparatus is being connected with the transmitting apparatus via the radio communication;

an identification information judging step for judging whether the identification information of the transmitting apparatus, which is being connected via the radio communication, is the same as the identification information obtained by the identification information obtaining step; and a switch controlling step for transmitting an instruction to the transmitting apparatus to switch an output of the contents data from the radio communication to the cable communication and switches an input of the contents data to the receiving apparatus from the radio communication to the cable communication when the identification information judging step judges that the identification information of the transmitting apparatus is the same as the obtained identification information.

6. The operating method of the receiving apparatus according to claim 5, wherein the switch controlling step transmits an instruction to the transmitting apparatus to switch the output of the contents data from the cable communication to the radio communication and switches the input of the contents data to the receiving apparatus from the cable communication to the radio communication when the connection with the transmitting apparatus via the cable communication is terminated while the connection with the transmitting apparatus via the radio communication is kept.

7. The operating method of the receiving apparatus according to claim 5, further comprising an identification information managing step for managing the identification information of one or more transmitting apparatuses which are connected via the radio communication;

an identification information determining step for determining the identification information same as the identification information of the transmitting apparatus, with which the connection via the cable communication is terminated, among the identification information managed by the identification information managing step when the connection with the transmitting apparatus via the cable communication is terminated while the connection with the transmitting apparatus via the radio communication is not kept; and a connection controlling step for causing the receiving apparatus to automatically connect with the transmitting apparatus via the radio communication wherein the identification information of the transmitting apparatus is identified by the identification information determining step.

8. The operating method of the receiving apparatus according to claim 7, further comprising a reproducing state storing step for storing a reproducing state of the transmitting apparatus, with which the connection via the cable communication is terminated, when the connection with the transmitting apparatus via the cable communication is terminated while the connection with the transmitting apparatus via the radio communication is not kept; and a reproducing state transmitting step for transmitting a reproducing state stored by the reproducing state storing step to the determined transmitting apparatus to cause the transmitting apparatus to recover the reproducing state, after the receiving apparatus is automatically connected with the determined transmitting apparatus via the radio communication by the connection controlling step.

9. An operating program of a receiving apparatus which comprises a radio communication unit which connects via a radio communication with a transmitting apparatus which transmits contents data; and a cable communication unit which is connected with the transmitting apparatus via a cable communication wherein the receiving apparatus receives the contents data, and the program makes a computer execute:

an identification information obtaining step for obtaining identification information of the transmitting apparatus, which is used via the radio communication, from the transmitting apparatus via the cable communication when the transmitting apparatus is connected via the cable communication while the receiving apparatus is being connected with the transmitting apparatus via the radio communication;

an identification information judging step for judging whether the identification information of the transmitting apparatus, which is being connected via the radio communication, is the same as the identification information obtained by the identification information obtaining step; and a switch controlling step for transmitting an instruction to the transmitting apparatus to switch an output of the contents data from the radio communication to the cable communication and switches an input of the contents data to the receiving apparatus from the radio communication to the cable communication when the identification information judging step judges that the identification information of the transmitting apparatus is the same as the obtained identification information.

10. The operating program of the receiving apparatus according to claim 9, wherein the switch controlling step transmits an instruction to the transmitting apparatus to switch the output of the contents data from the cable communication to the radio communication and switches the input of the contents data to the receiving apparatus from the cable communication to the radio communication when the connection with the transmitting apparatus via the cable communication is terminated while the connection with the transmitting apparatus via the radio communication is kept.

11. The operating program of the receiving apparatus according to claim 9, further making the computer execute:

an identification information managing step for managing the identification information of one or more transmitting apparatuses which are connected via the radio communication;

an identification information determining step for determining the identification information same as the identification information of the transmitting apparatus, with which the connection via the cable communication is terminated, among the identification information managed by the identification information managing step when the connection with the transmitting apparatus via the cable communication is terminated while the connection with the transmitting apparatus via the radio communication is not kept; and a connection controlling step for causing the receiving apparatus to automatically connect with the transmitting apparatus via the radio communication wherein the identification information of the transmitting apparatus is identified by the identification information determining step.

12. The operating program of the receiving apparatus according to claim 11, further making the computer execute:

a reproducing state storing step for storing a reproducing state of the transmitting apparatus, with which the connection via the cable communication is terminated, when the connection with the transmitting apparatus via the cable communication is terminated while the connection with the transmitting apparatus via the radio communication is not kept; and a reproducing state transmitting step for transmitting a reproducing state stored by the reproducing state storing step to the determined transmitting apparatus to cause the transmitting apparatus to recover the reproducing state, after the receiving apparatus is automatically connected with the determined transmitting apparatus via the radio communication by the connection controlling step.

\* \* \* \* \*